(12) United States Patent
Laurin et al.

(10) Patent No.: US 11,910,745 B2
(45) Date of Patent: Feb. 27, 2024

(54) MOWER DECK WITH ACTUATED BLADE HOUSINGS

(71) Applicant: Briggs & Stratton, LLC, Wauwatosa, WI (US)

(72) Inventors: Robert S. Laurin, Durhamville, NY (US); Mark J. Melone, Rome, NY (US); E. Mark Lynch, Munnsville, NY (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 667 days.

(21) Appl. No.: 17/005,963

(22) Filed: Aug. 28, 2020

(65) Prior Publication Data
US 2021/0059116 A1    Mar. 4, 2021

Related U.S. Application Data

(60) Provisional application No. 62/903,703, filed on Sep. 20, 2019, provisional application No. 62/893,929, filed on Aug. 30, 2019.

(51) Int. Cl.
| | |
|---|---|
| A01D 34/66 | (2006.01) |
| A01D 75/30 | (2006.01) |
| A01D 34/78 | (2006.01) |
| A01D 34/82 | (2006.01) |
| A01D 101/00 | (2006.01) |

(52) U.S. Cl.
CPC ............ *A01D 34/66* (2013.01); *A01D 34/78* (2013.01); *A01D 34/828* (2013.01); *A01D 75/303* (2013.01); *A01D 75/306* (2013.01); *A01D 2101/00* (2013.01)

(58) Field of Classification Search
CPC ...... A01D 34/66; A01D 34/78; A01D 34/828; A01D 75/303; A01D 75/306; A01D 34/661; A01D 2101/00
See application file for complete search history.

(56) References Cited

U.S. PATENT DOCUMENTS

| | | | |
|---|---|---|---|
| 4,395,865 A * | 8/1983 | Davis, Jr. ............. | A01D 75/306 56/13.6 |
| 6,591,593 B1 * | 7/2003 | Brandon ................ | A01D 69/02 56/10.8 |
| 6,874,308 B1 | 4/2005 | Bartel | |

(Continued)

FOREIGN PATENT DOCUMENTS

WO    WO-2010140929 A1 * 12/2010 ........... A01D 34/661

*Primary Examiner* — Alicia Torres
(74) *Attorney, Agent, or Firm* — Foley & Lardner LLP

(57) ABSTRACT

A mower includes a pair of drive wheels, a pairs of non-drive wheels, and a mower deck. The mower deck includes a central deck housing, a first blade housing, a second blade housing, and an actuator coupled to the central deck housing and at least one of the first blade housing and the second blade housing. The first blade housing is pivotally coupled to a first side of the central deck housing so as to be angularly displaceable relative to the central deck housing, the second blade housing is pivotally coupled to a second side of the central deck housing so as to be angularly displaceable relative to the central deck housing. The actuator is configured to selectively raise and lower at least one of the first blade housing and the second blade housing relative to the central deck housing.

20 Claims, 10 Drawing Sheets

(56) References Cited

U.S. PATENT DOCUMENTS

| | | | |
|---|---|---|---|
| 8,166,735 B1 | 5/2012 | Schnell | |
| 8,544,246 B2 | 10/2013 | Jackson et al. | |
| 9,220,194 B2 | 12/2015 | Ulmefors et al. | |
| 9,439,349 B2 | 9/2016 | Drake et al. | |
| 9,867,331 B1 * | 1/2018 | Siudyla | A01D 34/76 |
| 9,949,436 B2 | 4/2018 | Ito et al. | |
| 10,051,786 B2 | 8/2018 | Mullet et al. | |
| 10,391,854 B1 * | 8/2019 | Keller | B62D 11/04 |
| 10,499,565 B2 | 12/2019 | Ito et al. | |
| 10,631,459 B2 | 4/2020 | Mullet et al. | |
| 2011/0030327 A1 * | 2/2011 | Latuszek | A01D 75/303 |
| | | | 56/16.3 |
| 2014/0223878 A1 * | 8/2014 | Sassone | A01D 34/824 |
| | | | 56/320.1 |
| 2016/0106020 A1 * | 4/2016 | Akahane | A01D 34/66 |
| | | | 56/17.1 |
| 2019/0254228 A1 * | 8/2019 | Tate | A01D 69/005 |

* cited by examiner

MOWER DECK WITH ACTUATED BLADE HOUSINGS

CROSS-REFERENCE TO RELATED PATENT APPLICATIONS

This application claims the benefit of U.S. Provisional Application No. 62/903,703, filed Sep. 20, 2019, and U.S. Provisional Application No. 62/893,929, filed Aug. 30, 2019, both of which are incorporated herein by reference in their entireties.

BACKGROUND

The present disclosure relates generally to mower decks for use with ride-on, stand-on, and/or walk-behind mowers, and more particularly to a winged mower deck having blade housings that are pivotally coupled to a central deck housing.

Conventionally, mower decks used in conjunction with ride-on, stand-on, and/or commercial walk-behind mowers have included two or more blades arranged at offset positions both laterally and longitudinally with respect to the mower, thereby providing for a wider cutting path as compared to single-blade mowers (e.g., small, residential walk-behind mowers). In many configurations, these mower decks are hung or otherwise suspended from a mower frame at a position between respective front and rear wheels of the mower. In other configurations, the mower decks may be suspended in front of the respective front wheels, or be suspended or towed behind the respective rear wheels of the mower. The mower deck may be configured for side-discharge, rear-discharge, and/or mulching, with the discharge arrangement being dependent upon many factors, including mower type/size, regional conditions, customer preferences, etc.

The two or more mower blades of a conventional mower deck are generally supported within a housing that is formed or fabricated of metal, plastic, and/or any other suitable material. The mower deck housing is typically sized to be slightly wider than the wheel base of the mower, at most. Such a housing width allows for the desired wider cutting path, while not adversely affecting the maneuverability of the mower or causing "scalping" of the mowing surface when traveling over uneven terrain. Furthermore, such a housing width also allows the mower to fit onto a standard-width travel trailer or other vehicle for transport to/from various mowing locations. However, despite these advantages, there are still many mowing locations and/or scenarios in which a wider mower deck having additional mower blades would be desirable.

SUMMARY

One embodiment relates to a mower. The mower includes a pair of drive wheels, a pairs of non-drive wheels, and a mower deck. The mower deck includes a central deck housing, a first blade housing, a second blade housing, and an actuator coupled to the central deck housing and at least one of the first blade housing and the second blade housing. The central deck housing is configured to contain one or more central mower blades, the first blade housing is configured to contain a first mower blade and is pivotally coupled to a first side of the central deck housing so as to be angularly displaceable relative to the central deck housing, the second blade housing is configured to contain a second mower blade and is pivotally coupled to a second side of the central deck housing opposite the first side so as to be angularly displaceable relative to the central deck housing. The actuator is configured to selectively raise and lower at least one of the first blade housing and the second blade housing relative to the central deck housing.

Another embodiment relates to a mower deck. The mower deck includes a central deck housing configured to contain one or more central mower blades, a first blade housing configured to contain a first mower blade, a first electric motor operatively coupled to the first mower blade, a first blade housing sensor configured to determine if the first blade housing is angularly displaced relative to the central deck housing, a second blade housing configured to contain a second mower blade, a second electric motor operatively coupled to the second mower blade, and a second blade housing sensor configured to determine if the second blade housing is angularly displaced relative to the central deck housing. The first blade housing is pivotally coupled to a first side of the central deck housing so as to be angularly displaceable relative to the central deck housing. The second blade housing is pivotally coupled to a second side of the central deck housing opposite the first side so as to be angularly displaceable relative to the central deck housing.

Another embodiment relates to a mower. The mower includes a pair of drive wheels, a first controller, a second controller, and a mower deck. The mower deck includes a central deck housing configured to contain a central mower blade, a first blade housing configured to contain a first mower blade, a first electric motor communicably coupled to the first controller and operatively coupled to the first mower blade, a second blade housing configured to contain a second mower blade, and a second electric motor communicably coupled to the second controller and operatively coupled to the second mower blade. The first blade housing is pivotally coupled to a first side of the central deck housing so as to be angularly displaceable relative to the central deck housing, the first electric motor is selectively operated by the first controller, the second blade housing is pivotally coupled to a second side of the central deck housing opposite the first side so as to be angularly displaceable relative to the central deck housing, and the second electric motor is selectively operated by the second controller.

The invention is capable of other embodiments and of being carried out in various ways. Alternative exemplary embodiments relate to other features and combinations of features as may be recited herein.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-4, a zero turn radius (ZTR) mower 10 in accordance with an aspect of the disclosure is shown. For clarity, some components of ZTR mower 10 have been omitted. Thus, it is to be understood that ZTR mower 10 may include additional components not shown in FIGS. 1-4.

Figure 1:
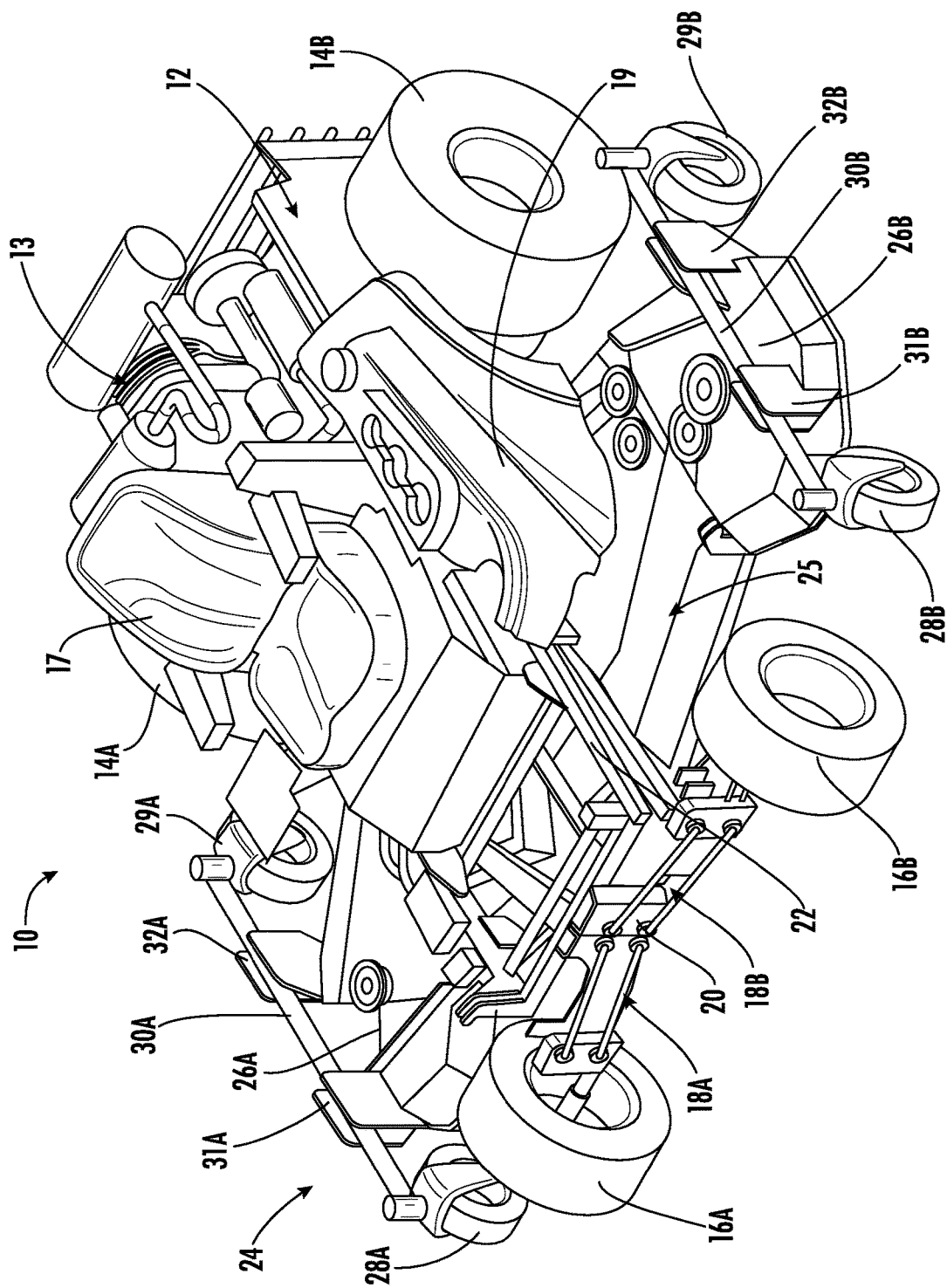
FIG. 1 is a top perspective view of a zero turn radius (ZTR) mower having a winged mower deck including a pair of respective first and second blade housings in an unfolded, active position, according to an exemplary embodiment.
Figure 2:
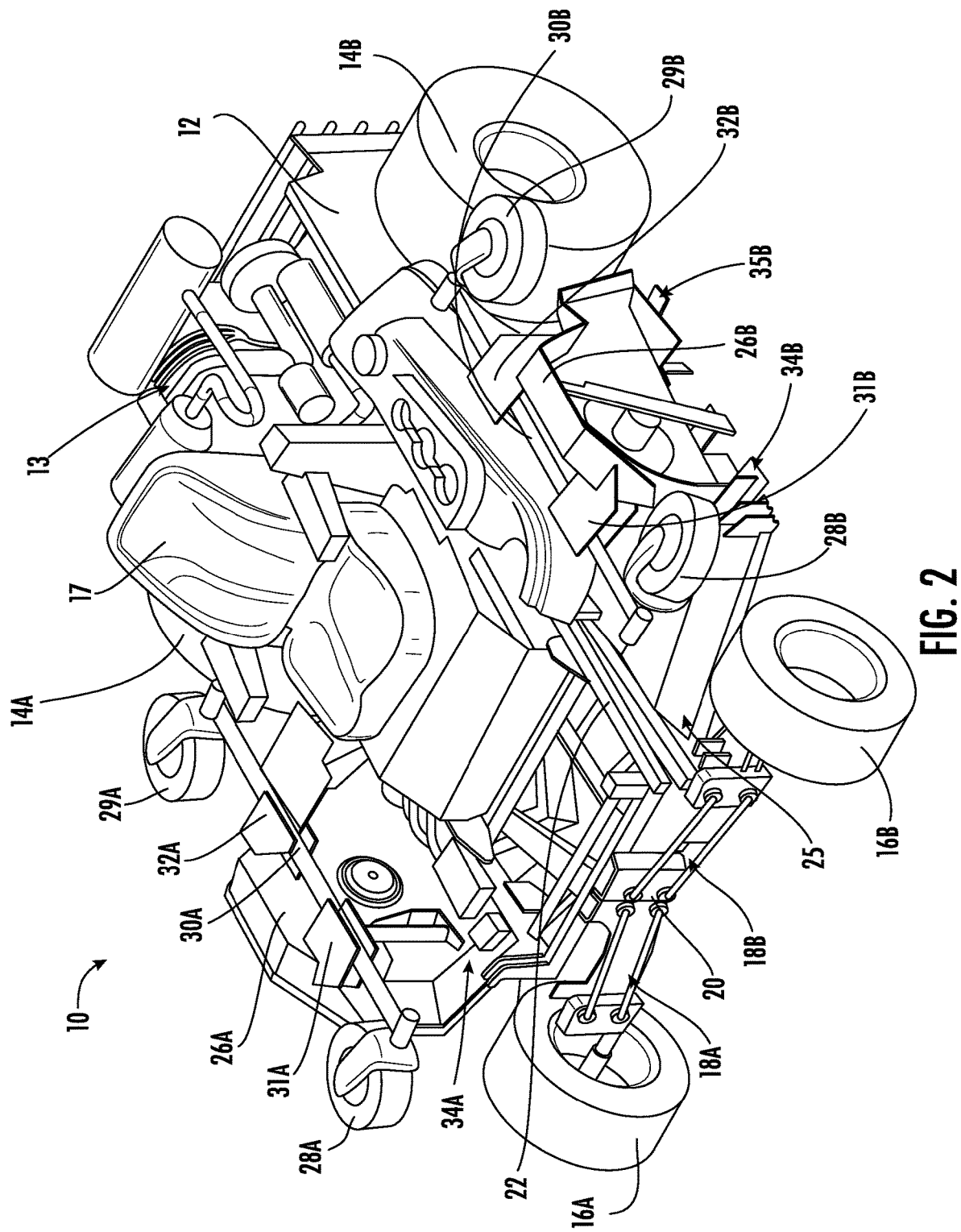
FIG. 2 is another top perspective view of the ZTR mower of FIG. 1 having the respective first and second blade housings of the winged mower deck in a folded, inactive position.

ZTR mower 10 includes a main chassis 12, a pair of rear drive wheels 14A, 14B, and a pair of front wheels 16A, 16B. As shown in FIGS. 1-2, the front wheels 16A, 16B are configured to be coupled to respective four-bar linkage assemblies 18A, 18B, which pivot relative to a front mounting plate 20 mounted on a front frame portion 22. In this way, the four-bar linkage assemblies 18A, 18B, when coupled to respective suspension assemblies (not shown), allow the respective front wheels 16A, 16B to be suspended independently. In FIGS. 1-2, front wheels 16A, 16B are illustrated as being steerable wheels. However, it is to be understood that front wheels 16A, 16B may be configured as, e.g., caster wheels. Additionally and/or alternatively, the front wheels 16A, 16B may be coupled to the front frame portion 22 via a linkage assembly (or assemblies) other than a four-bar linkage assembly.

ZTR mower 10 includes an operator seat 17, as well as a power head 13. In the embodiment shown in FIGS. 1-2, power head 13 is configured as a horizontal-shaft internal combustion engine. However, it is to be understood that power head 13 may be any appropriate power unit, such as, e.g., a vertical-shaft internal combustion engine, one or more electric motors, etc. Furthermore, power head 13 may be operably coupled to an electrical generator, thereby enabling ZTR mower 10 to operate in a hybrid power configuration, wherein some or all of the driven implements of the mower (e.g., the mower blades, the drive wheels, etc.) may be driven by respective electric motors coupled to the electrical generator. Alternatively, some or all of the driven implements may be driven by the internal combustion engine forming power head 13 through, e.g., hydraulic transmission (s), belt-and-pulley arrangements, etc.

As is shown in FIGS. 1-4, ZTR mower 10 further includes an operator console 19, which is only partially illustrated for clarity of other aspects of ZTR mower 10. It is to be understood that ZTR mower 10 may include other features such as, e.g., steering/speed controls, deck height controls, parking brake controls, etc., which are not shown in FIGS. 1-4. The operator console 19 may provide an interface through which a user of the ZTR mower 10 may control the ZTR mower 10 through various user inputs. The operator can control the steering of the mower 10, raise or lower the mower deck 24 relative to the ground, control the speed of the mower 10, or activate the blades of the mower deck 24. As described further herein, the ZTR mower 10 may further include a plurality of controllers coupled to each electric motor to facilitate the user controls.

Referring still to FIGS. 1-4, ZTR mower 10 also includes a mower deck 24 positioned below the front frame portion 22 and between respective front wheels 16A, 16B and rear drive wheels 14A, 14B. As will be described in further detail below, mower deck 24 is configured to hold a plurality of rotating mower blades for the cutting of grass and/or other vegetation. More specifically, mower deck 24 includes a central deck housing 25 and respective first and second blade housings 26A, 26B. As will be described in more detail below, each of first and second blade housings 26A, 26B are pivotally coupled to central deck housing 25 (on opposite sides) such that first blade housing 26A and second blade housing 26B are independently angularly displaceable relative to central deck housing 25, forming "wings" extending from central deck housing 25. In this way, one or both of first blade housing 26A and second blade housing 26B may be lifted away from the ground or other cutting surface when not in use, allowing the overall footprint of the ZTR mower 10 to remain substantially the same as a mower having a conventional mower deck coupled thereto when the respective blade housings are in an "upward", lifted position. However, when desired, one or both of the first and second blade housings 26A, 26B may be lowered toward the ground or other cutting surface so as to provide for a wider cutting path, thereby reducing the number of passes needed to mow a desired area. For example, the central deck housing 25 may provide an approximately 61-72 inch cutting width and the first and second blade housings 26A, 26B may each add approximately 21-25 inches of cutting width. In this way and when the first and second blade housings 26A, 26B are in the "raised" or "upward" position, the cutting width of the ZTR mower 10 may be 61-72 inches, and when the first and second blade housings 26A, 26B are in the "lowered" or "down" position, the cutting width of the ZTR mower 10 may be 103-122 inches.

In other embodiments, the mower deck 24 and its respective first and second blade housing 26A and 26B may be located closer towards the respective rear drive wheels 14A and 14B than towards the respective front wheels 16A and 16B. By locating the mower deck 24 closer to the rear drive wheels 14A and 14B than the front wheels 16A and 16B, the user of the ZTR mower 10 may be able to get on and off the mower 10 without applying force to the mower deck 24. A common problem in ZTR mowers with wide mower decks is that the user will step on the mower deck when they dismount the mower. This can lead to damage to the mower deck. By further moving the mower deck 24 towards the rear drive wheels 14A and 14B, the user can more easily dismount the ZTR mower 10 without stepping on the mower deck 24.

In accordance with one aspect of the disclosure, each of first and second blade housings 26A, 26B is coupled to a pair of caster wheel assemblies which include respective front caster wheel assemblies 28A, 28B and respective rear caster wheel assemblies 29A, 29B. The front caster wheel assemblies 28A, 28B and rear caster wheel assemblies 29A, 29B are respectively coupled to each other via a tube member 30A, 30B. In some embodiments, at least one of the first front caster wheel assembly 28A and the second front caster wheel assembly 28B includes a first sensor communicably coupled to at least one controller of the plurality of controllers. The first sensor may be a force sensor configured to determine if at least one of the first front caster wheel assembly 28A or second front caster wheel assembly 28B is contacting the ground. In further embodiments, the first sensor may be a tilt sensor configured to determine if at least one of the first front caster wheel assembly 28A or the second front caster wheel assembly 28B is lifted off of the ground at an angle. The first sensor communicating this information to the respective controller. In further embodiments, at least one of the first rear caster wheel assembly 29A and the second rear caster wheel assembly 29B include a second sensor communicably coupled to at least one controller of the plurality of controllers. The second sensor may be a force sensor configured to determine if at least one of the first rear caster wheel assembly 29A or second rear caster wheel assembly 29B is contacting the ground. In further embodiments, the second sensor may be a tilt sensor configured to determine if at least one of the first rear caster wheel assembly 29A or the second rear caster wheel assembly 29B is lifted off of the ground at an angle. The second sensor communicates this information to the respective controller. The second sensor and the first sensor may further be a variety of different force sensors including piezoelectric sensors, load cells, or force gauges.

As shown in FIGS. 1-2, the first blade housing 26A includes a front bracket 31A and a rear bracket 32A, with the tube member 30A being removably joined to both the front bracket 31A and the rear bracket 32A so as to couple the front caster wheel assembly 28A and the rear caster wheel assembly 29A to the first blade housing 26A, Accordingly, when first blade housing 26A is in a "lowered" position, each of front caster wheel assembly 28A and rear caster wheel assembly 29A are capable of contacting the ground. Similarly, the second blade housing 26B includes a front bracket 31B and a rear bracket 32B, with the tube member 30B being removably joined to both the front bracket 31B and the rear bracket 32B so as to couple the front caster wheel assembly 28B and the rear caster wheel assembly 29B to the first blade housing 26A. Thus, when second blade housing 26B is in a "lowered" position, each of front caster wheel assembly 28B and rear caster wheel assembly 29B are capable of contacting the ground. The second blade housing 26B and the first blade housing 26A may each further include a handle. The handle allows the user to manually lift up the respective blade housing.

With the inclusion of both the front caster wheel assemblies 28A, 28B and the rear caster assemblies 29A, 29B, the respective first and second blade housings 26A, 26B are capable of pivoting relative to central deck housing 25 when traveling over uneven or undulating terrain. As will be described in further detail below, the respective first and second blade housings 26A, 26B may not be limited to pivoting upward relative to central deck housing 25, but may be configured to allow for at least some angular displacement in a downward direction relative to central deck housing 25. As such, the first and second blade housings 26A, 26B may pivot upward and/or downward during travel in order to, e.g., provide an even cut, resist scalping of the mowing surface, etc.

Additionally, because the front caster wheel assemblies 28A, 28B are positioned forward of the respective first and second blade housings 26A, 26B and the rear caster assemblies 29A, 29B are positioned behind the respective first and second blade housings 26A, 26B, the first and second blade housings 26A, 26B may be reactive to changes in terrain, regardless of the direction of travel of the ZTR mower 10. That is, if the ZTR mower 10 is traveling in a forward direction, respective front caster wheel assemblies 28A, 28B will encounter changes in terrain first, allowing respective first and second blade housings 26A, 26B to pivot in reaction to such changes. Conversely, if the ZTR mower 10 is traveling in a reverse direction, or during turning maneuvers, the respective rear caster wheel assemblies 29A, 29B will encounter changes in terrain first, again allowing the first and second blade housings 26A, 26B to pivot in reaction to such changes. However, it is to be understood that the mower deck 24 is not limited to such a configuration, and more or fewer caster wheel assemblies may be utilized. Additionally, while the use of caster wheel assemblies may be preferable in conjunction with ZTR mower applications, it is to be understood that alternative wheel assemblies are also possible, such as, e.g., fixed wheel assemblies, one or more rollers, etc.

Figure 3:
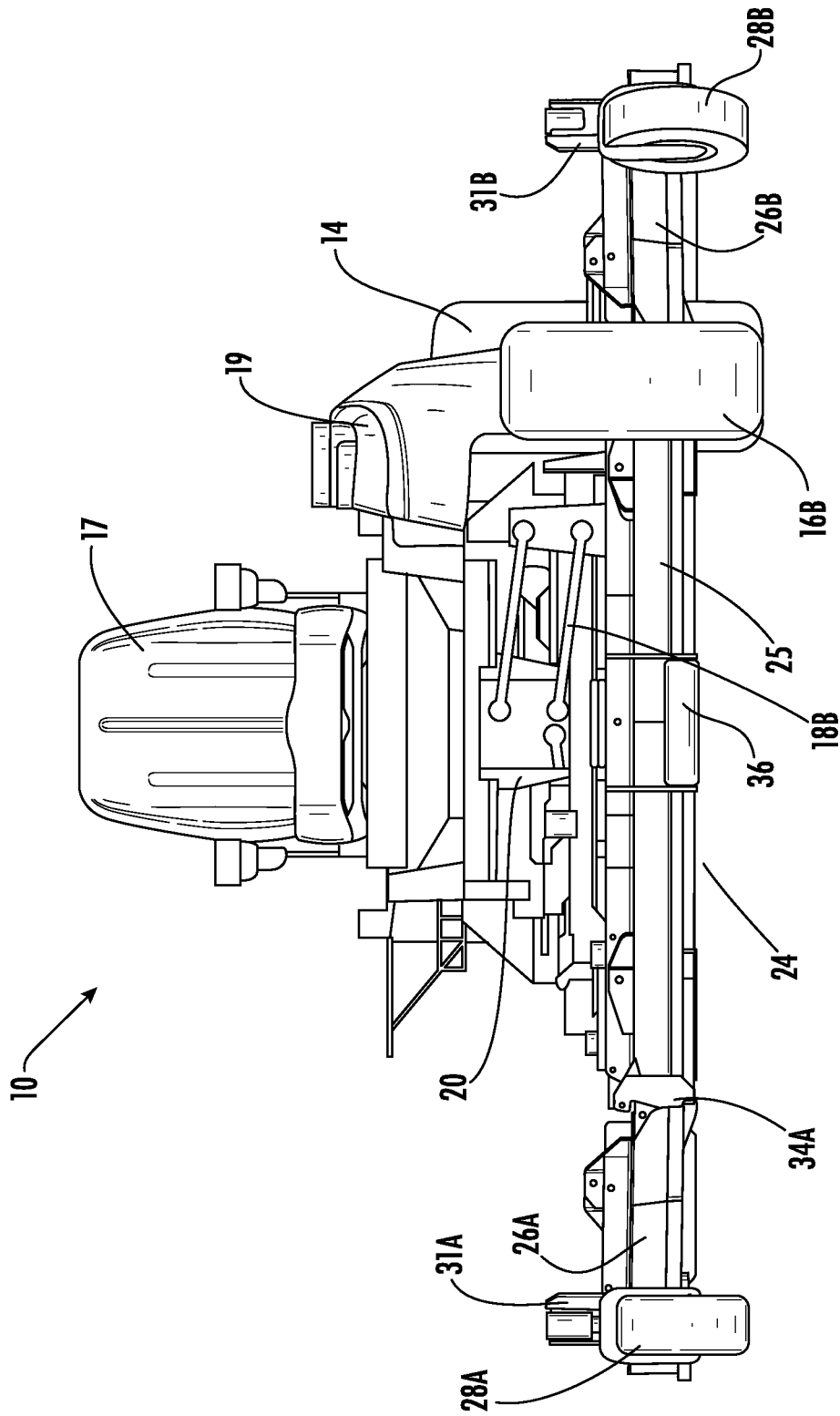
FIG. 3 is a partial front view of the ZTR mower in the configuration shown in FIG. 1.
Figure 4:
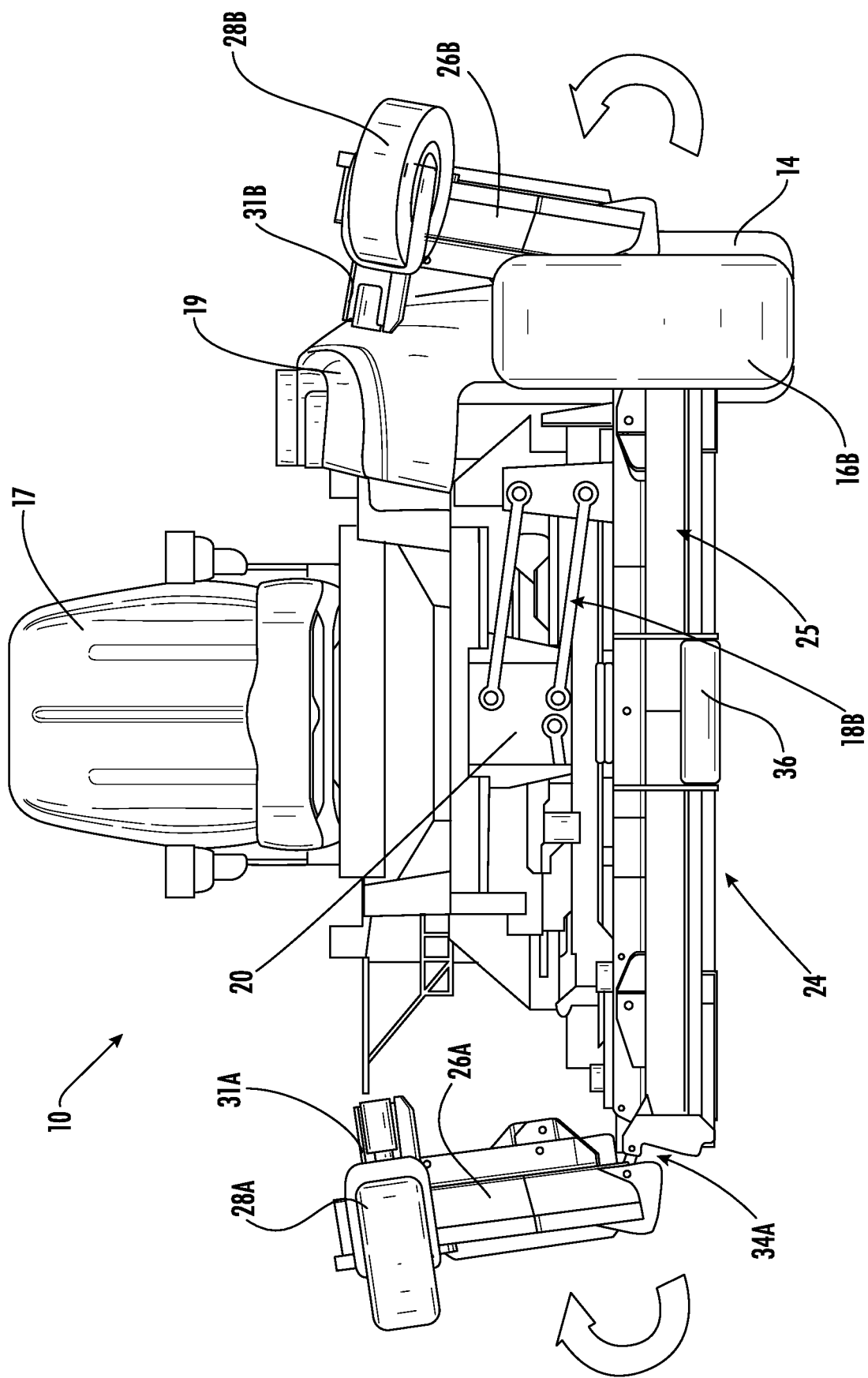
FIG. 4 is a partial front view of the ZTR mower in the configuration shown in FIG. 2.

Referring to FIGS. 3-4, central deck housing 25 further includes at least one roller 36, which allows mower deck 24 to act as a ground-following deck when fully lowered from the front frame portion 22. While not shown in FIGS. 1-4, the central deck housing 25 may be suspended from front frame portion 22 in such a way so as to allow the central deck housing 25 to pivot both longitudinally and laterally relative to the ZTR mower 10, allowing central deck housing 25 to adjust to changes in terrain.

Figure 5:
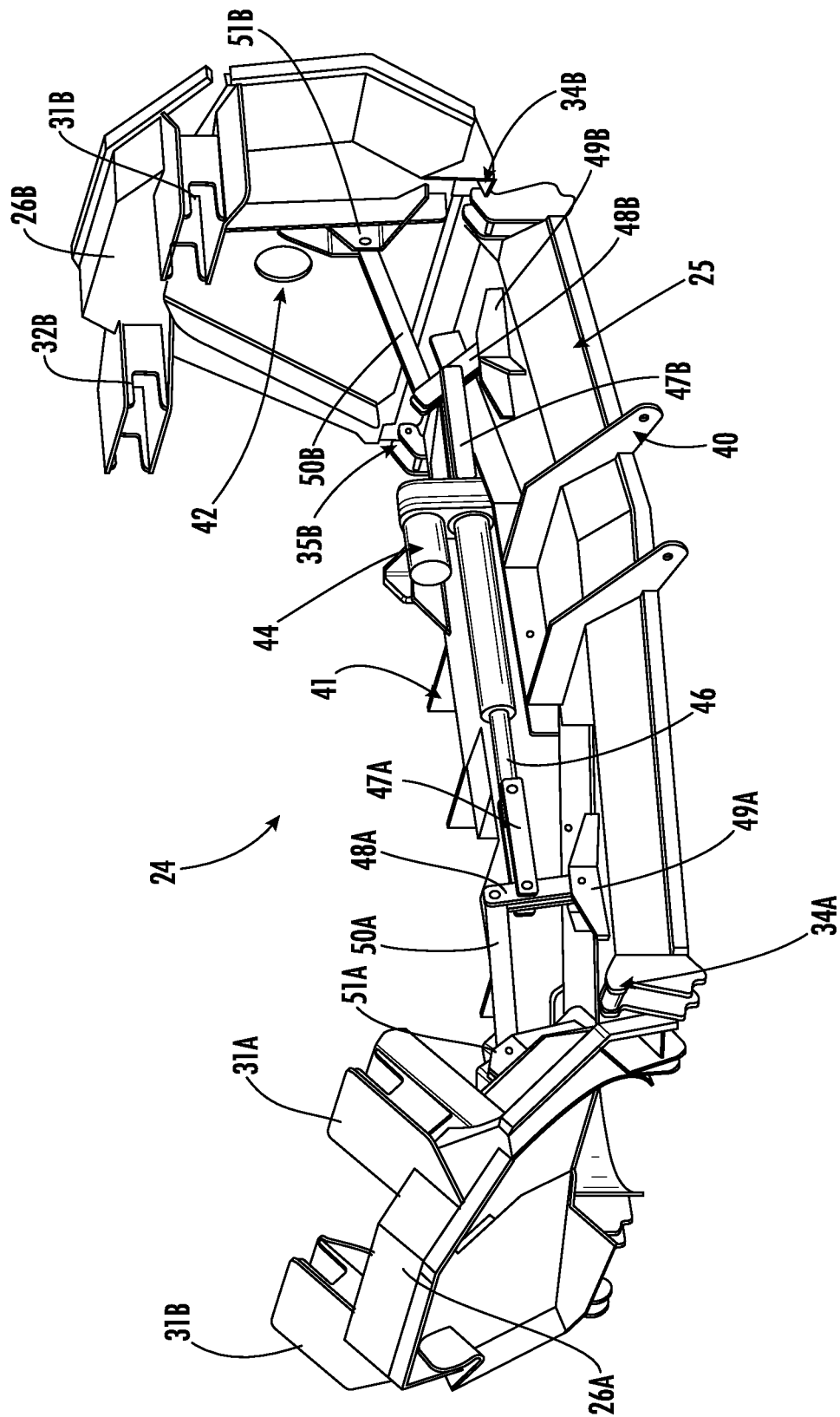
FIG. 5 is a partial top perspective view of the winged mower deck of FIG. 1, according to an exemplary embodiment.
Figure 6:
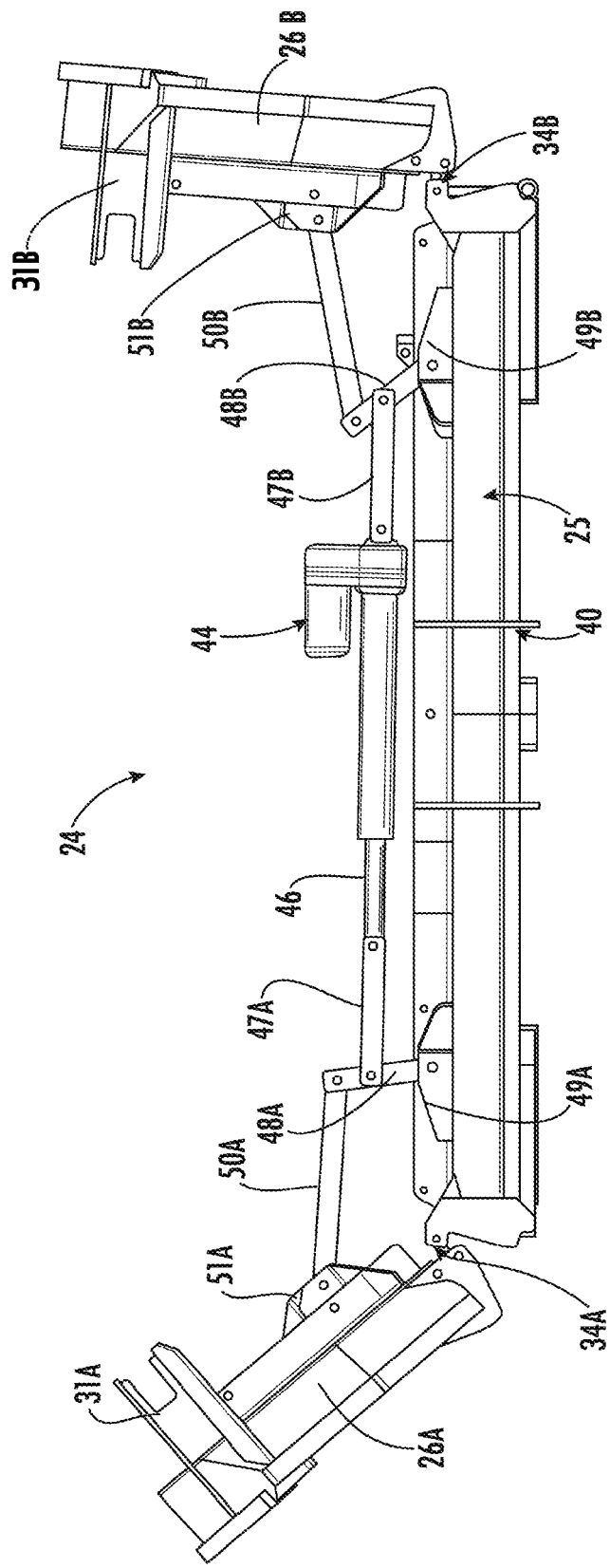
FIG. 6 is a partial front view of the winged mower deck of FIG. 5.

Next, referring to FIGS. 5-6, mower deck 24 in accordance with an aspect of the disclosure is shown. Central deck housing 25 includes a front roller bracket 40 and at least one rear roller bracket 41. As described above, central deck housing 25 may include at least one roller 36, which is held by front roller bracket 40 and/or rear roller bracket(s) 41. Additionally, the first blade housing 26A is pivotally coupled to the central deck housing 25 via a front pivot assembly 34A and a rear pivot assembly 35A (shown in FIGS. 8A-8B), while second blade housing 26B is pivotally coupled to the central deck housing 25 via a front pivot assembly 34B and a rear pivot assembly 35B. As will be described in further detail below, the respective front pivot assemblies 34A, 34B and rear pivot assemblies 35A, 35B may be configured to enable the first and second blade housings 26A, 26B to pivot relative the central deck housing 25 in both an upward and downward direction. Furthermore, while respective front pivot assemblies 34A, 34B and rear pivot assemblies 35A, 35B are shown and described, it is to be understood that in alternative configurations, more or fewer pivot assemblies may be utilized in order to provide pivotal movement between the first and second blade housings 26A, 26B and the central deck housing 25. In some embodiments, the first blade housing 26A and the second blade housing 26B are positioned rearward (e.g., closer to rear drive wheels 14A, 14B than to front wheels 16A, 16B) and inward (e.g., further inward toward the center of the mower) of where they are shown in FIG. 5. The deck mower deck 24 may be as wide as shown in FIG. 5, but the first blade housing 26A and the second blade housing 26B may extend farther towards the rear drive wheels 14A and 14B and farther towards the central deck housing 25. In further embodiments, the second blade housing 26B and the first blade housing 26A are angled relative to the central deck housing 25. By angling the first blade housing 26A and the second blade housing 26B relative to the central deck housing 25, the blades may further overlap and provide an even cutting width. As the blades overlap along the cutting path, they do not miss any grass while cutting the grass and therefore provide a better, more even cut.

FIGS. 5-6 also show a configuration for pivotally lifting the respective first and second blade housings 26A, 26B away from the mowing surface. Specifically, a linear actuator 44 may be utilized to simultaneously lift both first and second blade housings 26A, 26B in response to, e.g., user control inputs. In some embodiments, linear actuator 44 may comprise an electric motor-driven actuator. However, linear actuator 44 is not limited as such, and may include, e.g., hydraulically-driven actuator(s), pneumatically-driven actuator(s), mechanical actuator(s), etc. In further embodiments, the linear actuator 44 may be communicably coupled to at least one controller of the plurality of controllers that selectively actuates the linear actuator 44 based on user input. In other embodiments, other types of actuators or lifting mechanisms may be used in place of the linear actuator 44. For example, one or more rotary actuators, pulleys, drive belts, or even a direct drive motor may be coupled to the respective first and second blade housings 26A, 26B to rotate or lift the housings. In additional embodiments, one or more cables may be attached to each of the first and second blade housings 26A, 26B and to a winch at an opposite end. The winch may then pull or provide the cable to raise or lower the first and second blade housings 26A, 26B. In another embodiment, an electric motor may be directly coupled to a pivot rod 54 (FIG. 7) of the first and second blade housings 26A, 26B to raise or lower each. In other embodiments, a locking mechanism may be provided and the first and second blade housings 26A, 26B may be manually raised and lowered, with the locking mechanism holding each in a variety of angular displacements from the central deck housing 25. For example, the first and second blade housings 26A, 26B may include a gear mechanism, a locking fastener, etc. that holds the first and second blade housings 26A, 26B in a specified angular displacement. In another embodiment, the linear actuator 44 may include one or more locking mechanisms to prevent generally lateral and angular movement when specified.

In accordance with an aspect of the disclosure, a single linear actuator 44 is utilized to simultaneously raise and/or lower the respective first and second blade housings 26A, 26B. Thus, as a rod 46 of the linear actuator 44 is extended or retracted, both the first and second blade housings 26A, 26B move in concert with one another. Respective sides of the linear actuator 44 are coupled at one end to a respective first linkage 47A, 47B. In turn, first linkages 47A, 47B may be coupled at another end to respective second linkages 48A, 48B, which are pivotally coupled to a portion of the central deck housing 25 about respective top brackets 49A, 49B. Second linkages 48A, 48B are further coupled to respective third linkages 50A, 50B, which extend from an end of a second linkage 48A, 48B to a respective top bracket 51A, 51B on a respective surface of the first and second blade housings 26A, 26B. Through these interconnections between the first linkages 47A, 47B, second linkages 48A, 48B, and third linkages 50A, 50B, the linear actuator 44 is capable of simultaneously controlling the angular displacement of first and second blade housings 26A, 26B relative to the central deck housing 25.

In some embodiments, the linear actuator 44 may communicate with at least one controller regarding whether the respective first and second blade housing 26A and 26B have been lifted away from the mowing surface. The linear actuator 44 may determine if the respective first and second blade housing 26A and 26B have been lifted away from the mowing surface through a limit switch in the linear actuator 44. The limit switch may indicate that the linear actuator 44 has extended or retracted the rod 46. In further embodiments, the linear actuator 44 includes a motion sensor to determine if the rod 46 is extended or retracted. In additional embodiments, the linear actuator includes two sensors, a first actuator sensor and a second actuator sensor. The first actuator sensor determines whether the first blade housing 26A has been lifted away from the mowing surface and the second actuator sensor determines whether the second blade housing 26B has been lifted away from the mowing surface. The two sensors may be motion sensors configured to detect movement. Alternatively, the two sensors may be Hall Effect sensors that operate based on the Hall Effect, i.e. by detecting a change in the proximate magnetic field. In even other embodiments, the sensors may be LIDAR (light detection and ranging) sensors, capacitive displacement sensors, tilt sensors, proximity sensors, or other various sensors used to detect movement and or position. The first actuator sensor and the second actuator sensor may each be communicably coupled to at least one controller, bypassing the actuator 44. In further embodiments, the first actuator sensor and the second actuator sensor may be coupled to the same controller. In other embodiments, the linear actuator 44 may communicate with at least one controller whether the respective first and second blade housing 26A and 26B have been lifted away from the mowing surface. As referred to herein, a first sensor may refer to at least one of the first sensor and the first actuator sensor and a second sensor may refer to at least one of the second sensor and the second actuator sensor.

Alternatively, while not shown, it is to be understood that more than one linear actuator may be utilized, thereby coupling the first and second blade housings 26A, 26B to their own linear actuator. In such a configuration, the first and second blade housings 26A, 26B would be independently controllable, allowing the user to raise first blade housing 26A while leaving second blade housing 26B in a lowered position, and vice versa. In further embodiments, at least one controller may be communicably coupled to each linear actuator. In other embodiments, there may be two controllers and two linear actuators. The first controller is communicably coupled to the first blade housing 26A, the first linear actuator is coupled to the first blade housing 26A, the second controller is communicably coupled to the second blade housing 26B, and the second linear actuator is coupled to the second blade housing 26B. Each linear actuator and controller can work in tandem as described previously.

Control of the linear actuator 44 (or more than one linear actuator) may be provided at or near other user controls, e.g., on the operator console 19, in either a wired or wireless configuration. Additionally, or alternatively, control of the linear actuator 44 may be provided directly at the location of the linear actuator 44. More so, the plurality of controllers may further include individual circuits configured to handle the various operations of the ZTR mower 10. For example, the controllers may include a mower blade circuit to determine if the mower blades are activated. The controllers may further include a first housing circuit and a second housing circuit. The first housing circuit determines if the first blade housing 26A is raised or not, and the second housing circuit determines if the second blade housing 26B is raised or not. In further embodiments, is the controllers may be a single controller with a plurality of circuits. The single controller is communicably coupled to the linear actuator 44, the first sensor, the first actuator sensor, the second sensor, the second actuator sensor, and the three electric motors. In other embodiments, the first controller includes circuits pertaining to the first blade housing 26A and the second controller includes circuits pertaining to the second blade housing 26B. For example, the first controller may include an input/output circuit configured to receive input from the user in regards to operation of the first blade housing 26A, a mower blade circuit configured to operate the mower blades of the first blade housing 26A, and a actuator circuit configured to operate the linear actuator 44 and raise the first blade housing 26A. The second controller may include similar circuits corresponding to the second blade housing 26B.

Figure 7:
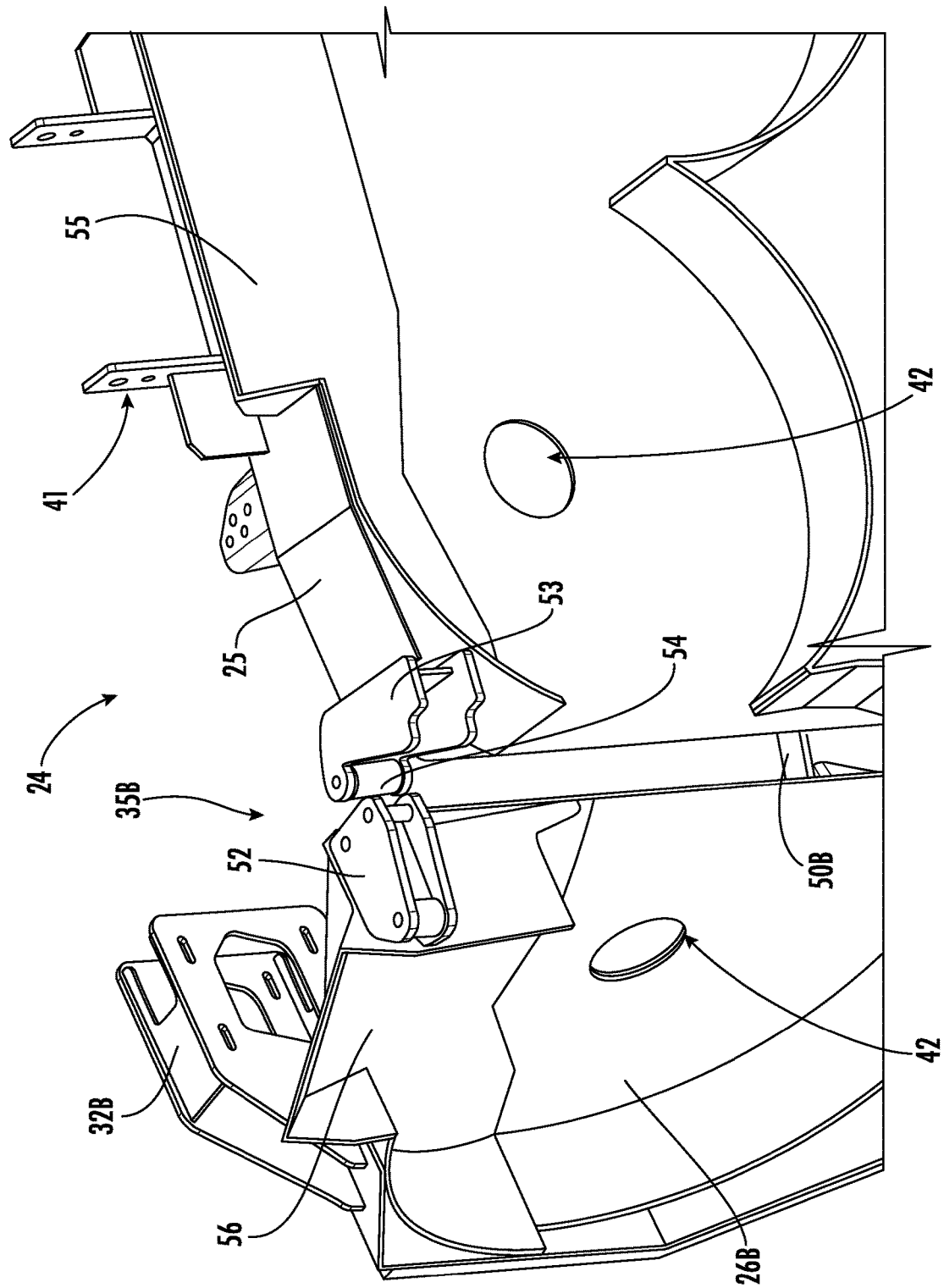
FIG. 7 is a partial bottom perspective view of the winged mower deck of FIG. 5.

Next, referring to FIG. 7, a partial underside view of mower deck 24 in accordance with an aspect of the disclosure is shown. More specifically, FIG. 7 illustrates rear pivot assembly 35B in greater detail. It is to be understood that the other pivot assemblies disclosed in relation to mower deck 24 (front pivot assemblies 34A, 34B and rear pivot assembly 35A) may be similarly constructed. For rear pivot assembly 35B, central deck housing 25 is provided with a first pivot bracket 53, while second blade housing 26B is provided with a second pivot bracket 52. A pivot rod 54 is coupled to both the first pivot bracket 53 and the second pivot bracket 52, thereby allowing the second blade housing 26B to angularly pivot relative to the central deck housing 25. Furthermore, the rear pivot assembly 35B (and the other pivot assemblies) are configured such that the respective first and second blade housings 26A, 26B may be removed from the central deck housing 25 by disconnection of the pivot rod 54 from one or both of the first pivot bracket 53 and the second pivot bracket 52. In this way, in some embodiments, one or both of the first and second blade housings 26A, 26B may be removable if, e.g., utilization of the "winged" configuration is not desirable, if one or both of the first and second blade housings 26A, 26B must be repaired or replaced, etc.

In accordance with another aspect of the disclosure, and also shown in FIG. 7, mower deck 24 may further include selectively removably rear discharge plates. Specifically, central deck housing 25 may include a selectively removable rear discharge plate 55, while second blade housing 26B may include a selectively removable rear discharge plate 56. Thus, dependent upon the type of discharge or mowing desired (i.e., side discharge, rear discharge, mulching, etc.), the user can either remove or install the respective rear discharge plates 55, 56 from the various housings forming mower deck 24. While not shown in FIG. 7, it is to be understood that the first blade housing 26A may also include a rear discharge plate.

Figure 8A:
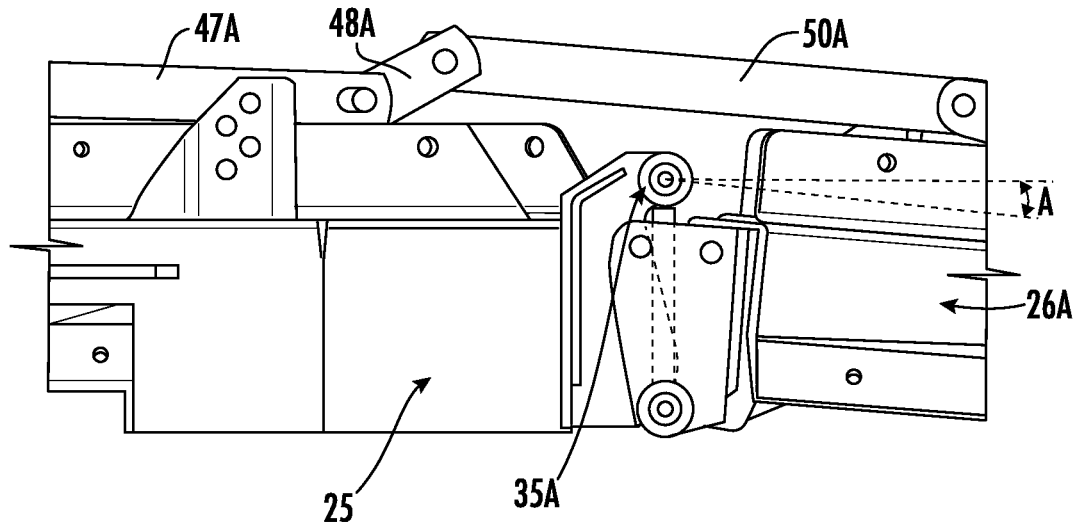
FIG. 8A is a partial rear view of the winged mower deck of FIG. 5 in a first angular position.
Figure 8B:
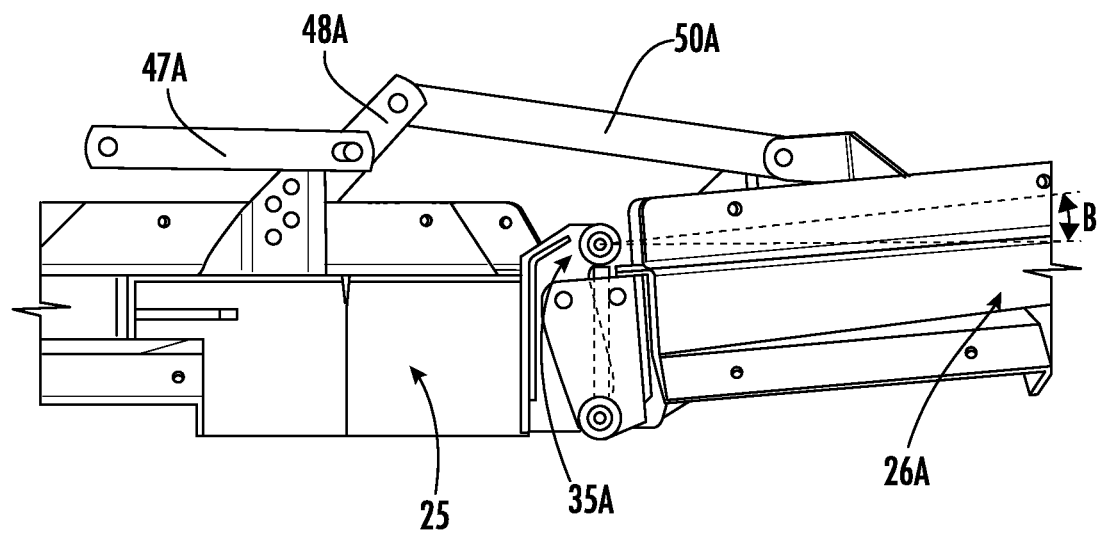
FIG. 8B is a partial rear view of the winged mower deck of FIG. 5 in a second angular position.

In reference to FIGS. 8A-8B, as described above with respect to FIGS. 1-4, the respective first and second blade housings 26A, 26B may not be limited to upward angular movement relative to the central deck housing 25. For example, as shown in FIG. 8A, when in a lowered position, first blade housing 26A may be permitted to pivot downward at a predetermined angle A as the mower travels over varied terrain, thereby allowing the first blade housing 26A to better follow the contours of the mowing surface. Conversely, referring to FIG. 8B, the first blade housing 26A may be permitted to pivot upward at a predetermined angle B when in a lowered position. The respective linkages 47A, 48A, 50A (along with the coupled linear actuator) may be configured so as not to restrict such upward and downward angular movement up to a predetermined amount when the first blade housing 26A is in the lowered position, thus allowing for better ground-following characteristics of the first blade housing 26A. Also, while not shown in FIGS. 8A-8B, it is to be understood that second blade housing 26B may be similarly configured.

Referring once again to FIG. 5 and FIG. 7, both central deck housing 25 and the first and second blade housings 26A, 26B are shown as having openings 42 formed therein, wherein openings 42 are provided so as to allow for the direct coupling of a mower blade (not shown) to be housed within the housings to a rotational driving source positioned above the mower blade. In accordance with an aspect of the disclosure, each mower blade may be driven by a dedicated electric motor mounted on the mower deck itself, thereby allowing each mower blade to rotate independent of all other mower blades. The electric motors may be powered by one or more batteries, one or more on-board electrical generators, or both. For example, in one embodiment, the central deck housing 25 may house three mower blades powered by three separate electric motors, the first blade housing 26A may house a single mower blade powered by an electric motor, and the second blade housing 26B may house a single mower blade powered by an electric motor. As noted above, the mower blades may be operated to rotate independently of one another. Thus, one or both of the first and second blade housings 26A, 26B are pivoted to an upward position such as that shown in FIG. 2 and FIG. 4, the electric motors rotating the mower blades of one or both of the first and second blade housings 26A, 26B may be deactivated, thereby preventing these mower blades from rotating. However, the mower blades housed by the central deck housing 25 may be independently controlled to continue rotating (and, thus, continue cutting), even if the first and second blade housings 26A, 26B are in an upward position.

In further embodiments, the three separate electric motors may each be communicably coupled to at least one controller. Each controller activates a respective electric motor, rotating (e.g., powering) the mower blades. The controller may only activate the electric motor and therefore the mower blades, if the linear actuator, the first sensor, or the second sensor indicate that one or both of the first blade housing 26A and second blade housing 26B are in the lowered position. In some embodiments this is side specific. For example, if the first blade housing 26A is in the lowered position but the second blade housing 26B is in the raised position, the second controller will not activate the electric motor to the mower blades in the second blade housing 26B, but the first controller may activate the electric motor to the mower blades in the first blade housing 26A and another controller may activate the electric motor to the mower blades in the central deck housing 25. In operation, the respective controller receives a user input from the user and information on whether the respective housing is raised or not raised from the first sensor or the second sensor. The controller then determines based on the two inputs if the controller should activate the respective electric motor, and if so, activates the electric motor. For example, if the user input tells the first controller to activate the mower blades in the first blade housing 26A, the first controller receives information from the first sensor indicating whether the first blade housing 26A is raised or lowered. If the first blade housing 26A is raised, the first controller does nothing. If the first blade housing 26A is lowered, the first controller activates the electric motor activating the mower blades in the first blade housing 26A.

Each of the mower blades within the separate housings are separately and individually operable. In some embodiments, the controllers will not send a signal to the linear actuator 44 if the electric motor is activated. In further embodiments, the first controller may not send a signal to the first linear actuator if the electric motor controlling the blades within the first blade housing 26A is activated, and the second controller may not send a signal to the second linear actuator if the electric motor controlling the blades within the second blade housing 26B is activated. The controllers may however activate the electric motor controlling the mower blades within the central deck housing 25 if the second blade housing 26B, the first blade housing 26A, or both are raised. Therefore, the mower blades within the central deck housing 25 are operable when the first blade housing 26A and the second blade housing 26B are in raised positions and the blades therein are in an off state.

The disclosed operation of the mower provides mower for a more effective and efficient mower operation. In conventional mowers, the mower blades will be either all on or all off. This can be a problem if a user only wants to mow using one side of the mower e.g., up against a building or going over a stump/obstacle. The ZTR mower 10 allows independent control of each set of blades providing a better and easier mowing of the lawn. For example, if the user needs to mow near or around a stump, the user using the operator console 19 may indicate they want the mower blades in the second blade housing 26B off but the other mower blades on. The user may then indicate they want the second blade housing 26B to be raised. The second controller may then raise the second blade housing 26B. The first controller and another controller of the plurality may then activate the electric motors and the mower blades in the first blade housing 26A and the central deck housing 25. The user may then mow over the stump with the second portion of the deck 24 without damaging the ZTR mower 10 and easily mow the grass near the stump. In another example, the user may indicate they want to raise one of the housings (without first turning off the blades in that housing), and once the housing is raised, the blades are automatically turned off for that particular housing. In this way, the user is protected from the mower blades as they automatically turn off when the mower blade housing containing the blades is raised.

Alternatively, in lieu of dedicated electric motors for each mower blade used with mower deck 24, the mower deck 24 may be configured to use a belt-and-pulley configuration driven by the power head 13 (e.g., an internal combustion engine) to drive all or some of the mower blades of the winged mower deck 24. To account for the pivotal movement of respective first and second blade housings 26A, 26B, such a belt-and-pulley configuration may utilize various tensioners, idler pulleys, etc. In another alternative embodiment, the blades of mower deck 24 may be driven by a combination of electric motors and a belt-and-pulley configuration. For example, the mower blades of the central deck housing 25 may be driven by a belt-and-pulley configuration, while the mower blades within the first and second blade housings 26A, 26B may be driven by dedicated electric motors.

Figure 9:
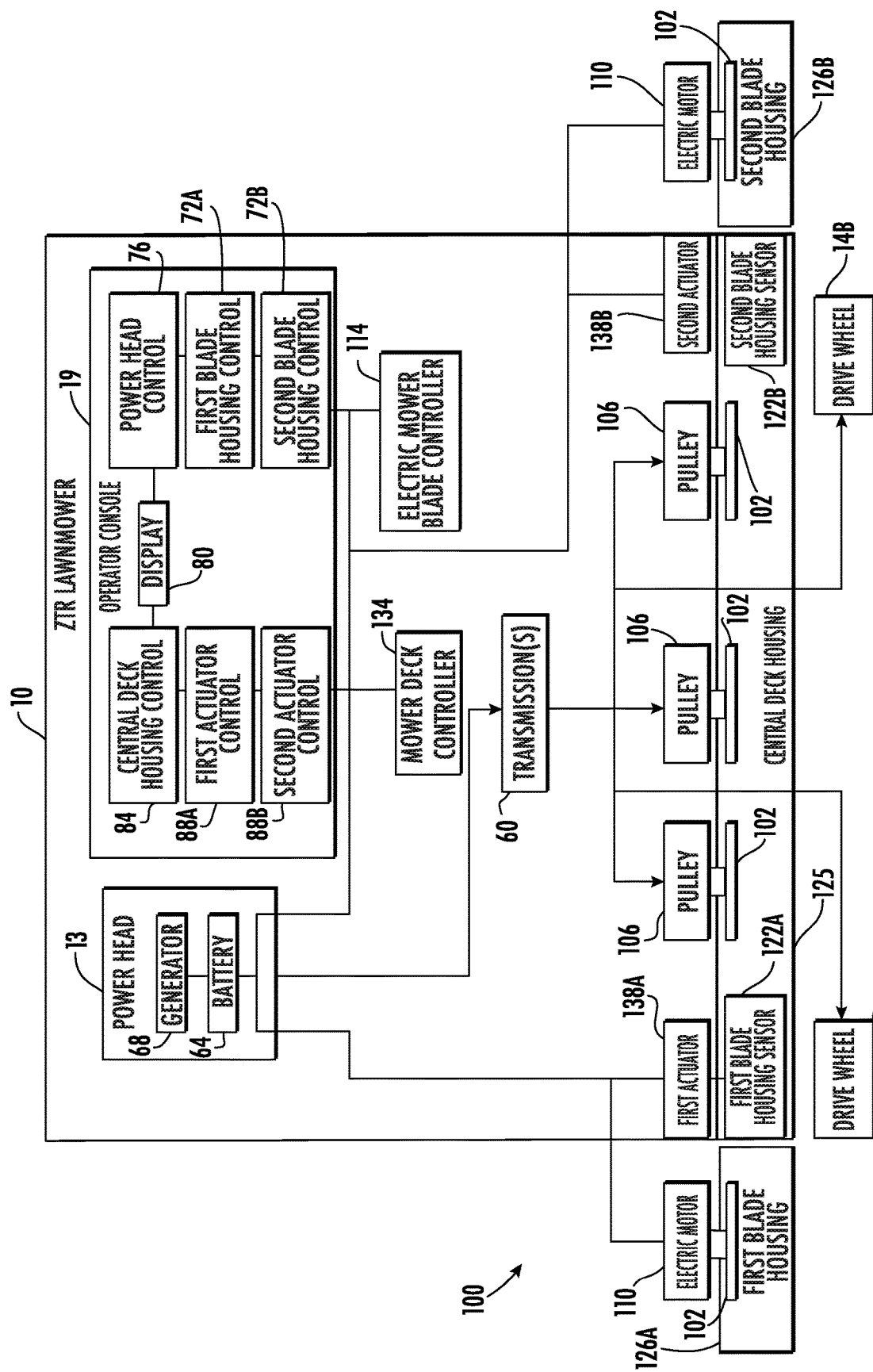
FIG. 9 is a schematic diagram of a hybrid winged mower deck and the mower of FIG. 1, according to an exemplary embodiment.

Referring now to FIG. 9, a schematic view of a hybrid winged mower deck 100 and the ZTR mower 10 is shown, according to an exemplary embodiment. The hybrid winged mower deck 100 operates and drives the cutting blades (as will be discussed further herein) through a combination of mechanical and electrical drive systems ("hybrid"). In some embodiments, it may be a combination of various other types of drive systems (e.g., hydraulic and electrical). The hybrid winged mower deck 100 includes a central deck housing 125 (similar to the central deck housing 25), a first blade housing 126A (similar to the first blade housing 26A) pivotally coupled to the central deck housing 125, and a second blade housing 126B (similar to the second blade housing 26B) pivotally coupled to the central deck housing 125. The central deck housing 125 includes multiple cutting blades 102 each coupled to one or more pulleys 106. The first and second blade housings 126A, 126B each include one or more cutting blades 102 each coupled to one or more electric motors 110. In some embodiments, the cutting blades 102 supported by and rotably coupled to the central deck housing 25 are powered or driven by one or more pulleys 106, and the cutting blades 102 supported by and rotably coupled to the first blade housing 126A and second blade housing 126B, respectfully, are powered or driven by one or more electric motors 110. In this way and in the hybrid winged mower deck 100, the pulleys 106 of the central deck housing 25 are powered by one or more transmissions (e.g., a belt and pulley system, a direct drive system coupled to the pulleys 106, etc.) 60 of the ZTR mower 10. Similarly, the electric motors 110 of the first blade housing 126A and the second blade housing 126B, respectfully are powered by an electrical power supply or battery (e.g., a lithium-ion battery, a capacitor, multiple batteries or capacitors, or other suitable energy storage devices) 64 of the power head 13. In some embodiments, the power head 13 produces electrical power that directly powers the electric motors 110. In even other embodiments, the cutting blades 102 of the first blade housing 126A and the second blade housing 126B are powered by a generator (e.g., an alternator, an integrated starter generator, etc.) 68 of the power head 13. In additional embodiments, the generator 68 may power the electric motors 110 when the power head 13 is running and the battery 64 powers the electric motors 110 when the power head 13 is not running.

In operation, the power head 13 (directly or indirectly) may produce both mechanical power (e.g., through an output shaft) and electrical power (e.g., through the generator 68). In embodiments where the power head 13 produces only electrical power, dedicated electrical motors may be provided to transform the electrical power into mechanical power. The power head 13 is operably coupled to one or more transmissions 60 which are operably coupled to and selectively apply the mechanical power to the pulleys 106 and the drive wheels 14A and 14B. In one embodiment, the power head 13 is operably coupled to a belt and pulley system, the belt and pulley system selectively applying power to the pulleys 106 and one or more hydrostatic transmissions. The hydrostatic transmissions may be coupled to the one or more drive wheels 14A and 14B and selectively drive each of the drive wheels 14A and 14B in either forward or reverse. In other embodiments, different types of transmissions may be used (e.g., the power head 13 may be coupled to the drive wheels through an intermediate shaft) to provide mechanical power to the drive wheels 14A and 14B. Similarly, the battery 64 or the generator 68 may be electrically and communicably (e.g., through a wired connection, through an electrical connection, etc.) coupled to the electric motors 110 to selectively provide electrical power to the electric motors 110. Beneficially, because both the electric motors 110 and the pulleys 106 are selectively operable, the hybrid winged mower deck 100 allows for independent control of both the cutting blades 102 of the central deck housing 25 and the cutting blades 102 of either the first blade housing 126A or the second blade housing 126B. As each housing is independently controllable, the user of the ZTR mower 10 can better select which blades they want to operate saving on cost, time, and wear on the cutting blades 102 themselves.

Still referring to FIG. 9, each electric motor 110 is communicably or electrically coupled to the electric mower blade controller 114, at least one of a first blade housing control 72A and a second blade housing control 72B, and in some embodiments at least one of a first blade housing sensor 122A and a second blade housing sensor 122B to further control operation of each electric motor 110. As described herein, the operator console 19 may contain one or more controls through which the user can interface with the ZTR mower 10. In one embodiment, the operator console 19 includes a power head control 76, a display 80, the first blade housing control 72A, the second blade housing control 72B, a central deck housing control 84, a first actuator control 88A, and a second actuator control 88B. The first blade and second blade housing controls 72A and 72B are configured to allow the user to selectively operate the electric motor 110 of the first blade housing 126A and the electric motor 110 of the second blade housing 126B, respectfully. In one embodiment, the first blade and second blade housing controls 72A and 72B are on/off switches that turn the respective electric motors 110 on/off. In another embodiment, the first blade and second blade housing controls 72A and 72B may be knobs, dials, or selectors that allow the user to adjust the rotations/minute (RPM) of the respective cutting blade 102. In even other embodiments, the first blade and second blade housing controls 72A and 72B are integrated within the display 80 (e.g., the display 80 is a touch screen that includes all of the controls of the operator console 19 within one user interface) to selectively control each of the respective electric motors 110.

The electric mower blade controller 114 is communicably coupled to the first blade and second blade housing controls 72A and 72B, the battery 64 or generator 68, the electric motors 110, the first blade housing sensor 122A, the second blade housing sensor 122B, and in some embodiments, a mower deck controller 134 to control the electric motors 110 of the first blade housing 126A and the second blade housing 126B. As discussed herein, the electric mower blade controller 114 may communicate with one or more components to determine whether the first blade housing 126A or the second blade housing 126B are in a position in which their electric motor 110 can be turned on. In some embodiments, the electric mower blade controller 114 receives information from the first blade housing sensor 122A and/or the second blade housing sensor 122B to determine the position of the first and second blade housing 126A and 126B. As described herein, the first blade housing sensor 122A and the second blade housing sensor 122B may be any type of sensor that is capable of determining the position, angular displacement, or location of the first and second blade housing 126A and 126B. In one embodiment, the first blade housing sensor 122A and the second blade housing sensor 122B may be at least one of a hall effect sensor, a limit switch, a tilt sensor, an accelerometer, a capacitive displacement sensor, an eddy-current sensor, an inductive sensor, a piezo electric transducer, a position encoder, a proximity sensor, or other types of sensors. In even other embodiments, the first blade housing sensor 122A and the second blade housing sensor 122B may be integrated within the one or more actuators (e.g., a first actuator 138A and a second actuator 138B). For example, the first blade housing sensor 122A and the second blade housing sensor 122B may be a signal from the respective actuator (which is coupled to the respective blade housing) that the actuator and therefore the blade housing are in the lowered position. If the electric mower blade controller 114 receives a command from the first blade housing control 72A or the second blade housing control 72B, but based on information received from one or more components of the ZTR mower 10 determines that one of the blade housings is in a raised positon, the electric mower blade controller 114 may ignore the command. In other embodiments, the electric mower blade controller 114 may ignore the command to raise at least one of the first blade housing 126A and the second blade housing 126B based on other information, such as information that the power head 13 is not operating correctly. In this way, the electric mower blade controller 114 can use the range of information available to keep the ZTR mower 10 from unwanted damage, wear, repairs, etc. In situations where the electric mower blade controller 114 ignores a command, the electric mower blade controller 114 may inform the user of such through the display 80 (e.g., with a message, an indicator, a flashing light, a noise, etc.).

In contrast, the pulleys 106 of the central deck housing 125 are operably coupled to and selectively driven by the one or more transmissions 60. In operation, at least one transmission 60 is selectively and operably coupled to each pulley 106 as selected by the user. For example, the user may selectively apply the transmission 60 to power the pulleys 106 through the central deck housing control 84. The central deck housing control 84 allows the user to activate, deactivate, and in some embodiments finely control the speed of each cutting blade 102 of the central deck housing 125. In one embodiment, the central deck housing control 84 is a mechanical lever that is coupled to the transmission 60 to selectively activate the pulleys 106 and therefore the cutting blades 102. In other embodiments, the central deck housing control 84 is an on/off switch, a knob, or other selectors that is communicably, operably, or indirectly coupled to the transmission 60 to selectively operate the pulleys 106 and therefore the cutting blades 102. In even other embodiments and as will be discussed further herein, the central deck housing control 84 is a control that is communicably or electrically coupled to one or more controllers to selectively operate the cutting blade 102 of the central deck housing. Beneficially, because the cutting blades 102 of the central deck housing 125 are powered via mechanical power and because the cutting blades 102 of the first blade housing 126A and the second blade housing 126B are powered via electrical power, the ZTR mower 10 is not overly reliant on any one kind of power. As a result, if a component relevant to one type of power (e.g., the battery 64 or the generator 68) were to be damaged or not work, some of the cutting blades 102 will still operate.

Still referring to FIG. 9, the mower deck controller 134 is communicably or electrically coupled to at least the first actuator 138A (e.g., the linear actuator 44, a hydraulic actuator, a pivot actuator, etc.), the second actuator 138B (e.g., a second linear actuator 44, a second hydraulic actuator, a second pivot actuator, etc.), the battery 64 or generator 68, the first actuator control 88A, the second actuator control 88B, and the electric mower blade controller 114. In operation, the first actuator control 88A and the second actuator control 88B selectively control the raising and lowering of the first blade housing 126A and the second blade housing 126B, respectfully through the mower deck controller 134. In some embodiments, the first actuator control 88A and the second actuator control 88B are switches that simply allow selection of a first position (e.g., lowered) and a second position (e.g., raised) of the respective blade housing. In other embodiments, the first actuator control 88A and the second actuator control 88B may be knobs, dials, selectors, etc. that allow for fine control of each actuator 138A, 138B. In this way, the first actuator control 88A and the second actuator control 88B may allow for the user to selectively choose the angular displacement of the respective blade housing via the respective actuator. For example, the user may decide they want the second blade housing 126B displaced at approximately 45 degrees, and may do so by adjusting the second actuator control 88B. The mower deck controller 134 may then communicate with various components of the ZTR mower 10 (e.g., the electric mower blade controller 114, the power head 13, the second blade housing sensor 122B, etc.) to determine if conditions allow for the raising or lowering of the second blade housing 26B. If conditions allow, the second actuator control 88B may then control the second actuator 138B to raise or lower the second blade housing 126B to be displaced at approximately 45 degrees. In other embodiments, the first actuator control 88A and the second actuator control 88B may only allow for control between a "raised" (e.g., about 90 degrees of displacement from the central deck housing 125) position or a "lowered" (e.g., about 0 degrees of displacement from the central deck housing 125) position.

Figure 10:
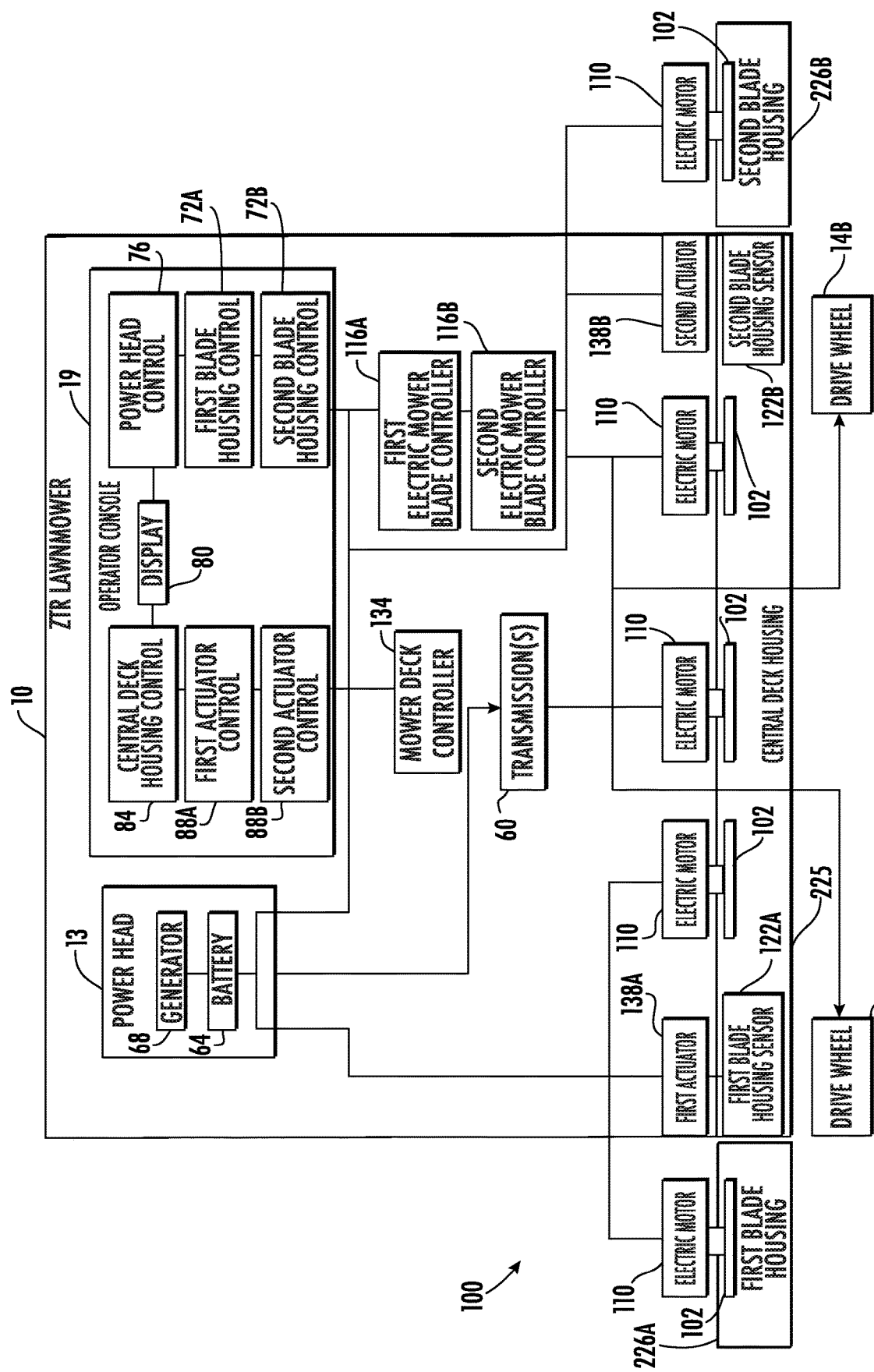
FIG. 10 is a schematic diagram of an electric winged mower deck and the ZTR mower of FIG. 1, according to an exemplary embodiment.

Referring now to FIG. 10, a schematic view of an electric winged mower deck 200 and the ZTR mower 10 is shown, according to an exemplary embodiment. The electric winged mower deck 200 includes a central deck housing 225 (similar to the central deck housing 25), a first blade housing 226A (similar to the first blade housing 26A), and a second blade housing 226B (similar to the second blade housing 26B), each including one or more of the cutting blades 102. The electric winged mower deck 200 operates the multiple cutting blades 102 through electrical drive systems. In comparison to the hybrid winged mower deck 100, the electric winged mower deck 200 includes multiple cutting blades 102, each cutting blade 102 operably and rotably coupled to at least one of the electric motors 110. Additionally, while there are shown to be three cutting blades 102 and three electric motors 110 within the central deck housing 225, there may be more or less. For example, the central deck housing 225 may include 1, 2, 3, 4, or more electric motors 110, each electric motor 110 coupled to one of the cutting blades 102. Similarly, while the first blade housing 226A and the second blade housing 226B are both shown to include a single electric motor 110 and cutting blade 102, they may include 1, 2, 3, 4, or more cutting blades 102 and electric motors 110.

The drive wheels 14A and 14B are operably coupled to and driven by the one or more transmissions 60 (e.g., two hydrostatic transaxles). In embodiments where the power head 13 generates only electrical power, the one or more transmissions 60 may be multiple electrical motors operatively coupled to the drive wheels 14A, 14B to selectively drive each. In this way and with the electric winged mower deck 200, the ZTR mower 10 could be an entirely electric mower that is powered via the one or more batteries 64 or the power head 13. In embodiments where the ZTR mower 10 is entirely electric, the power head 13 may include multiple batteries 64 in place of the generator 68, each battery 64 having multiple cells (due to the large electrical power demand). In other embodiments, the transmissions 60 may be two or more hydrostatic transaxles that receive power from the power head 13 and selectively drive each of the drive wheels 14A, 14B.

In operation, the first blade housing control 72A, the second blade housing control 72B, and the central housing deck control 84 are configured to selectively operate or activate the electric motors 110 (and rotate the cutting blades 102) of the first blade housing 226A, the second blade housing 226B, and the central deck housing 225, respectfully. In this way, the first blade housing control 72A, the second blade housing control 72B, and the central deck control 84 may be electrically or communicably coupled to at least one of a first electric mower blade controller 116A and a second electric mower blade controller 116B. The first electric mower blade controller 116A and the second electric mower blade controller 116B may each be electrically or operatively coupled to multiple electric motors 110, the mower deck controller 134, the first blade housing sensor 122A, the second blade housing sensor 122B, the other electric mower blade controller 116/116B, and the battery 64 or the generator 68. The first electric mower blade controller 116A and the second electric mower blade controller 116B may be communicably coupled and each control approximately half of the electric motors 110. For example, in the embodiment shown there are five total electric motors 110 and the first electric mower blade controller 116A may control three electric motors 110 (e.g., the electric motor 110 of the first blade housing 226A and two of the electric motors 110 of the central deck housing 225). In comparison, the second electric mower blade controller 116A may control two electric motors 110 (e.g., the electric motor 110 of the second blade housing 226B and one electric motor 110 of the central deck housing 225). In other embodiments, the first and second electric mower blade controllers 116A, 116B may share or control the electric motors 110 in various other ways (e.g., one electric mower blade controller controlling the electric motors 110 of the first blade housing 226A and the second blade housing 226B and another controller controlling the electric motors 110 of the central deck housing 225). Advantageously and by doing so, the first and second electric mower blade controllers 116A, 116B do not control all of the electric motors 110 and can better/faster react and make decisions based on the variety of information each controller receives.

Similar to the electric mower blade controller 114, the first and second electric mower blade controllers 116A, 116B are communicably or operatively coupled to at least one of the first blade housing control 72A and the second blade housing control 72B as well as the central deck housing control 84 to receive operation commands from each and then selectively operate the electric motors 110. For example the user, may activate or turn the first blade housing control 72A to the "on" position. The first blade housing control 72A may send a signal to the first electric mower blade controller 116A (which in this example controls the electric motor 110 of the first blade housing 226A) to turn the electric motor 110 of the first blade housing 226A "on" (e.g., power the electric motor 110). The first electric mower blade controller 116A may communicate with one or more of the first blade housing sensor 122A, the first actuator 138A, and the mower deck controller 134 to determine if conditions allow the electric motor 110 of the first blade housing 226A to be turned on (e.g., if the first blade housing 226A is in a lowered position or if the first blade housing 226A is within a specified angular displacement from the central deck housing 25). If conditions allow, the first electric mower blade controller 116A may then activate the electric motor 110 of the first blade housing 226A. In another example, the user may move the central deck housing control 84 to a position that specifies approximately 3200 RPM of each mower blade 102 (or a "high" speed). The central deck housing control 84 may then send a signal to the second electric mower blade controller 116B (which in this second example controls the electric motors 110 of the central deck housing 225) to power each cutting blade 102 of the central deck housing 25 to 3200 RPM. The second electric mower blade controller 116B may then determine if conditions allow the electric motors 110 of the central deck housing 225 to be turned on (e.g., determine if all the electric motors 110 working, determine if there enough power in the battery 64 to power the electric motors 110, determine if the power head 13 operating is correctly/is powered "on," etc.). If conditions do not allow, the second electric mower blade controller 116B may communicate this to the display 80 and provide a message to the user indicating such (e.g., "check engine," "batteries are low on power," etc.).

It should be understood that each controller (e.g., the mower deck controller 134, the first electric mower blade controller 116A, etc.) may include and perform actions via one or more circuits that perform the operations described. Each circuit may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

Additionally, while each controller (e.g., the mower deck controller 134, the first electric mower blade controller 116A, the second electric mower blade controller 116B) are shown as being separate physical controllers, various controllers may be combined to form one or more controllers with circuits dedicated to the processes of the various combined controllers. For example, the mower deck controller 134 and the electric mower blade controller 114 may be combined into a single having a "mower blade circuit" and an "electric mower blade circuit" that perform the operations described herein. Similarly, the first and second electric mower blade controllers 116A, 116B, and/or the mower deck controller 134 may be combined into a single controller performing the operations described herein.

Furthermore, while the first and second actuators 138A, 138B and the first and second blade housing sensors 122A, 122B are shown as being on the or apart of the central deck housing 125, 225, they may be implemented as one or more of the first blade housing 26A, 126A, 226A and the second blade housing 26B, 126A, 226A. For example, the first blade housing sensor 122A may be coupled or located on the first blade housing 126A, 226A. In even other embodiments, they are located on various other parts of the ZTR mower 10.

While the ZTR mower 10 shown and described above with respect to FIGS. 1-2 and 9-10 is a ride-on mower, it is to be understood that the mower deck 24 described herein may be utilized with any type of mower, including, e.g., stand-on mowers, walk-behind mowers, outdoor power equipment (e.g., a tractor with a mower deck), etc. Furthermore, while mower deck 24 is shown as a mid-mount mower deck (i.e., mounted between the respective front and rear wheels of the mower), it is to be understood that mower deck 24 could be configured as an "out-front" mower deck (i.e., extending forward of the front wheels of the mower or other vehicle), a tow-behind mower deck (i.e., extending behind the rear wheels of the mower or other vehicle), or any other alternative deck position.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A mower, comprising:
a pair of drive wheels;
a pair of non-drive wheels; and
a mower deck, the mower deck comprising:
a central deck housing, wherein the central deck housing is configured to hold one or more central mower blades;
a first blade housing configured to contain a first mower blade, wherein the first blade housing is pivotally coupled to a first side of the central deck housing so as to be angularly displaceable relative to the central deck housing;
a second blade housing configured to contain a second mower blade, wherein the second blade housing is pivotally coupled to a second side of the central deck housing opposite the first side so as to be angularly displaceable relative to the central deck housing;
an actuator coupled to the central deck housing and both of the first blade housing and the second blade housing, the actuator configured to selectively raise and lower both the first blade housing and the second blade housing relative to the central deck housing; and
a first linkage assembly and a second linkage assembly, both the first linkage assembly and the second linkage assembly including:
an actuator linkage coupled to the actuator;
a deck linkage pivotably coupled to the actuator linkage and the central deck housing; and
a blade housing linkage pivotably coupled to the deck linkage and pivotably coupled to the first blade housing and the second blade housing, respectively.

2. The mower of claim 1, wherein the first mower blade and the second mower blade are powered by one or more electric motors.

3. The mower of claim 2, wherein the one or more central mower blades of the central deck housing are powered by the one or more electric motors.

4. The mower of claim 2, wherein the mower deck further comprises a blade housing sensor coupled to at least one of the central deck housing, the first blade housing, or the second blade housing,
wherein the blade housing sensor is configured to determine if at least one of the first blade housing and the second blade housing is angularly displaced relative to the central deck housing at an angle greater than a predetermined minimum angle.

5. The mower of claim 4, wherein the mower deck further comprises a controller communicably coupled to the one or more electric motors and the blade housing sensor, and wherein the controller prevents the one or more electric motors from operating if the blade housing sensor indicates at least one of the first blade housing and the second blade housing is angularly displaced relative to the central deck housing at an angle greater than the predetermined minimum angle.

6. A mower deck comprising:
a central deck housing configured to contain one or more central mower blades,
a first blade housing configured to contain a first mower blade, wherein the first blade housing is pivotally coupled to a first side of the central deck housing so as to be angularly displaceable relative to the central deck housing;
a first electric motor operatively coupled to the first mower blade;
a first blade housing sensor configured to determine if the first blade housing is angularly displaced relative to the central deck housing;
a second blade housing configured to contain a second mower blade, wherein the second blade housing is pivotally coupled to a second side of the central deck housing opposite the first side so as to be angularly displaceable relative to the central deck housing;
a second electric motor operatively coupled to the second mower blade;
a second blade housing sensor configured to determine if the second blade housing is angularly displaced relative to the central deck housing;
an actuator coupled to the central deck housing and both of the first blade housing and the second blade housing, the actuator configured to selectively raise and lower both of the first blade housing and the second blade housing relative to the central deck housing; and
a first linkage assembly and a second linkage assembly, both the first linkage assembly and the second linkage assembly including:
an actuator linkage coupled to the actuator;
a deck linkage pivotably coupled to the actuator linkage and the central deck housing; and
a blade housing linkage pivotably coupled to the deck linkage and pivotably coupled to the first blade housing and the second blade housing, respectively.

7. The mower deck of claim 6, wherein the central deck housing has a cutting width between about 61 inches and about 72 inches and wherein the first blade housing and the second blade housing each have a cutting width between about 21 inches and about 25 inches.

8. The mower deck of claim 6, wherein at least one of the first blade housing sensor and the second blade housing sensor are integrated within the actuator.

9. The mower deck of claim 6, wherein the first blade housing sensor is a first limit switch coupled to the first blade housing and the second blade housing sensor is a second limit switch coupled to the second blade housing.

10. The mower deck of claim 6, wherein the first blade housing sensor, the second blade housing sensor, the first electric motor, and the second electric motor are communicably coupled to one or more controllers, wherein the controllers will not operate at least one of the first electric motor and the second electric motor if at least one of the first blade housing sensor and the second blade housing sensor indicates at least one of the first blade housing and the second blade housing is angularly displaced relative to the central deck housing.

11. A mower comprising:
a pair of drive wheels;
a first controller;
a second controller; and
a mower deck, the mower deck comprising:
a central deck housing configured to contain a central mower blade,
a first blade housing configured to contain a first mower blade, wherein the first blade housing is pivotally coupled to a first side of the central deck housing so as to be angularly displaceable relative to the central deck housing;
a first electric motor communicably coupled to the first controller and operatively coupled to the first mower blade, the first electric motor selectively operated by the first controller;
a first blade housing sensor configured to determine if the first blade housing is angularly displaced relative to the central deck housing;
a second blade housing configured to contain a second mower blade, wherein the second blade housing is pivotally coupled to a second side of the central deck housing opposite the first side so as to be angularly displaceable relative to the central deck housing;
a second electric motor communicably coupled to the second controller and operatively coupled to the second mower blade, the second electric motor selectively operated by the second controller;
a second blade housing sensor configured to determine if the second blade housing is angularly displaced relative to the central deck housing;
an actuator coupled to the central deck housing and both of the first blade housing and the second blade housing, the actuator configured to selectively raise and lower both of the first blade housing and the second blade housing relative to the central deck housing; and
a first linkage assembly and a second linkage assembly, both the first linkage assembly and the second linkage assembly including:
an actuator linkage coupled to the actuator;
a deck linkage pivotably coupled to the actuator linkage and the central deck housing; and
a blade housing linkage pivotably coupled to the deck linkage and pivotably coupled to the first blade housing and the second blade housing, respectively.

12. The mower of claim 11, further comprising an operator console including a first blade housing control communicably coupled to the first controller and a second blade housing control communicably coupled to the second controller.

13. The mower of claim 12, wherein the first blade housing sensor is communicably coupled to the first controller.

14. The mower of claim 12, wherein the operator console further includes an actuator control.

15. The mower of claim 11, further comprising a power head including one or more rechargeable batteries, wherein the mower deck further includes a third electric motor communicably coupled to at least one of the first controller and the second controller and operatively coupled to the central mower blade, and wherein the drive wheels, the first electric motor, the second electric motor, and the third electric motor are powered by the one or more rechargeable batteries.

16. The mower of claim 11, wherein the first blade housing, the second blade housing, and the central deck housing are each a rear discharge blade housing.

17. The mower of claim 1, wherein the first linkage assembly is coupled to a first side of the actuator and the second linkage assembly is coupled to a second side of the actuator.

18. The mower of claim 1, wherein the first linkage assembly and the second linkage assembly are both configured to angularly displace the first blade housing and the second blade housing, respectively, relative to the central deck housing in response to an actuation by the actuator.

19. The mower deck of claim 6, wherein the first linkage assembly is coupled to a first side of the actuator and the second linkage assembly is coupled to a second side of the actuator, and wherein the first linkage assembly and the second linkage assembly are both configured to angularly displace the first blade housing and the second blade housing, respectively, relative to the central deck housing in response to an actuation by the actuator.

20. The mower of claim 11, wherein the first linkage assembly is coupled to a first side of the actuator and the second linkage assembly is coupled to a second side of the actuator, and wherein the first linkage assembly and the second linkage assembly are both configured to angularly displace the first blade housing and the second blade housing, respectively, relative to the central deck housing in response to an actuation by the actuator.

* * * * *